United States Patent [19]

Tokoro

[11] Patent Number: 5,021,958
[45] Date of Patent: Jun. 4, 1991

[54] DEVICE AND METHOD FOR DETERMINING TARGET VALUE OF CONTROLLABLE VARIABLE ASSOCIATED WITH VEHICLE RUNNING STATE

[75] Inventor: Setsuo Tokoro, Susono, Japan

[73] Assignee: Toyota Jidosha Kabushiki Kaisha, Toyota, Japan

[21] Appl. No.: 437,083

[22] Filed: Nov. 16, 1989

[30] Foreign Application Priority Data

Nov. 18, 1988 [JP] Japan .................. 63-291887

[51] Int. Cl.$^5$ .......................... G06F 7/70; G06G 7/00; B60K 31/00; F02D 1/00
[52] U.S. Cl. .......................... 364/426.04; 364/424.01; 364/424.1; 364/431.01; 123/349; 180/170
[58] Field of Search .................. 364/426.04, 426.01, 364/424.01, 424.1, 431.04, 431.01, 513; 180/170, 174, 178; 123/349, 351, 352

[56] References Cited

U.S. PATENT DOCUMENTS

| 4,809,175 | 2/1989 | Hosaka et al. | 364/424.01 |
| 4,841,815 | 6/1989 | Takahashi | 364/424.1 X |
| 4,911,259 | 3/1990 | Dogahara et al. | 180/170 |
| 4,916,979 | 4/1990 | Irwin | 364/424.1 X |

FOREIGN PATENT DOCUMENTS 60-155044 8/1985 Japan .
61-8305 3/1986 Japan .
63-246546 10/1988 Japan .

OTHER PUBLICATIONS

Society of Instrumentation and Control Engineering, Japan, pp. 23–30, S. Yasunobu et al., "A Fuzzy Control for Train Automatic Stop Control".

Primary Examiner—Parshotam S. Lall
Assistant Examiner—E. J. Pipala
Attorney, Agent, or Firm—Oblon, Spivak, McClelland, Maier & Neustadt

[57] ABSTRACT

Device and apparatus for determining a target value of a controllable variable such as a drive torque associated with a running state of a motor vehicle, so that the variable is controlled so as to coincide with the determined target value. Initially, a basic value used as a basis for determining the target value is determined depending upon at least a currently required output of the vehicle engine which is represented by an accelerator pedal operating amount, for example. Then, control rules for compensating the basic value are defined based on at least one parameter indicative of a running condition of the vehicle, such as a vehicle weight and a road gradient. Finally, a compensation factor for compensating the basic value to obtain the target value is determined based on the control rules according to a fuzzy set theory.

14 Claims, 12 Drawing Sheets

FIG. 2

| SHIFT POSITION | | C1 | C2 | C0 | B1 | B2 | B3 | B0 | F1 | F2 | F0 |
|---|---|---|---|---|---|---|---|---|---|---|---|
| P | | | | ○ | | | | | | | |
| R | | | ○ | ○ | | | ○ | | | | |
| N | | | | ○ | | | | | | | |
| D | 1 | ○ | | ○ | | | | | | ◎ | ◎ |
| D | 2 | ○ | | ○ | ○ | | | | ◎ | | ◎ |
| D | 3 | ○ | ○ | ○ | ○ | | | | | | ◎ |
| D | 4 | ○ | ○ | | ○ | | | ○ | | | |
| 2 | 1 | ○ | | ○ | | | | | | ◎ | ◎ |
| 2 | 2 | ○ | | ○ | ○ | ○ | | | ◎ | | ◎ |
| 2 | 3 | ○ | ○ | ○ | ○ | | | | | | ◎ |
| L | 1 | ○ | | ○ | | | ○ | | | ◎ | ◎ |
| L | 2 | ○ | | ○ | ○ | ○ | | | ◎ | | ◎ |

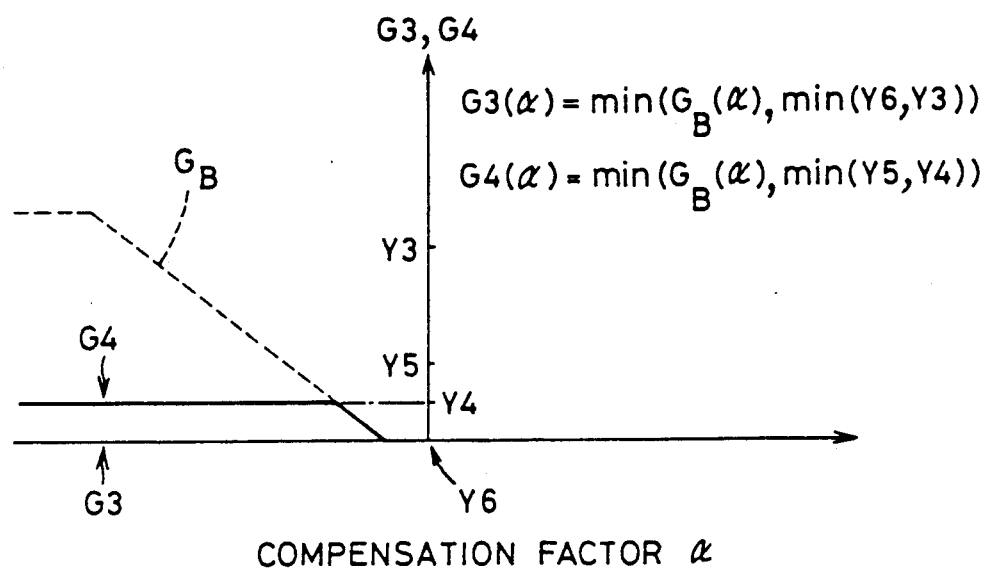
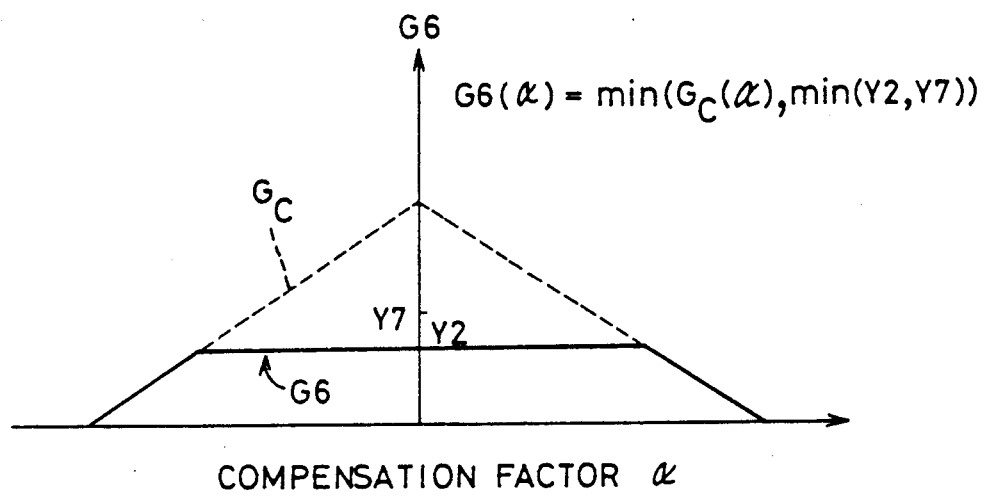

DEVICE AND METHOD FOR DETERMINING TARGET VALUE OF CONTROLLABLE VARIABLE ASSOCIATED WITH VEHICLE RUNNING STATE

BACKGROUND OF THE INVENTION

1. Field of the Invention

The present invention relates to a controller for controlling a component or components of a motor vehicle such as an engine, such that a controllable variable such as a torque, speed or horsepower of the engine, an input shaft speed or speed reduction ratio of an automatic transmission of the vehicle, or a drive torque or acceleration value of the vehicle coincides with a desired or target value. More particularly, the invention is concerned with a device and a method for determining a target value of such a controllable variable associated with the running state of the vehicle.

2. Discussion of the Prior Art

In an automotive vehicle, the engine, automatic transmission and other components or units are controlled so that the actual values of controllable variables or parameters such as the horsepower, torque and speed of the engine, and the input shaft speed and speed reduction ratio of the automatic transmission are regulated so as to coincide with respective desired or target values which are determined from time to time.

For instance, Publication No. 61-8305 of examined Japanese Patent Application proposes a method of controlling a vehicle engine by regulating a throttle actuator so that the actual speed of the engine coincides with a determined target value. An alternative method of controlling the vehicle engine is disclosed in Publication No. 60-155044, wherein the throttle actuator is controlled so that the actual engine horsepower is made equal to a determined target horsepower value.

The target engine horsepower or torque, for example, is generally determined depending upon the currently detected amount of operation of the accelerator pedal, and according to a predetermined relationship between the optimum target horsepower or torque value and the operating amount of the accelerator pedal. The predetermined relationship is represented by a data map stored in the relevant controller. The target value may be determined depending upon the currently detected running speed of the vehicle as well as the operating amount of the accelerator pedal, according to a predetermined relationship among these three parameters, i.e., horsepower or torque of the engine, operating amount of the accelerator pedal and running speed of the vehicle.

For improved regulation of the running condition of the vehicle, it is desirable to use other parameters representative of the vehicle running condition such as the road surface gradient and the vehicle weight (including the load), to determine the desired or target value of the engine horsepower or torque, for example. In this case, however, the calculation of the target value requires an extremely complicated procedure. For instance, when the target engine horsepower value is calculated based on the operating amount of the accelerator pedal, the road surface gradient and the vehicle running speed and weight, the calculation requires data processing according to data map (or functional equations) involving the four independent variables and the relevant variable (target horsepower) to be controlled.

In connection with the gradient of the road surface, for example, it is possible to determine the target horsepower value, depending upon whether the gradient value is "relatively small" or "relatively large". According to this arrangement, the target horsepower value largely changes stepwise from one value to another, depending upon whether the road surface gradient is smaller or larger than a predetermined threshold value which defines the boundary between the two road gradient conditions, i.e., "inclined road" and "non-inclined road". To avoid this inconvenience, it is necessary to use an expensive sensor for more accurately detecting the road gradient, so that the determined target horsepower value more exactly reflects the actual gradient of the road on which the vehicle is running. However, this solution needs considerably complicated data map regarding the road gradient.

On the other hand, the quantitative detection of a parameter such as the road gradient or vehicle weight representing the vehicle running condition does not meet the practical requirement in controlling a controllable variable such as the engine torque or vehicle drive torque. Namely, the practical requirement is based on the qualitative analysis of the vehicle running parameter, for example, depending upon whether the gradient is relatively large or relatively small. For example, the determined target drive torque is increased by a relatively small amount if the uphill road gradient is relatively small. Thus, the quantitative detection of vehicle running parameters to determine the target value of a controllable variable is not practically necessary, and complicates the determination of the target value, where the qualitative analysis of the running parameter satisfies the practical need.

SUMMARY OF THE INVENTION

It is therefore a first object of the present invention to provide a device for adequately determining a desired or target value of a controllable variable associated with the running state of a motor vehicle, which device does not require expensive high-precision sensors for detecting parameters representative of the vehicle running condition, and which device permits non-stepwise determination of the target value that suits the actual vehicle running condition.

A second object of the invention is to provide a method for determining a target value of a controllable variable associated with the running state of a motor vehicle, without requiring expensive sensors for detecting parameters representative of the vehicle running conditions, and such that the determined target value exactly reflects the vehicle running condition.

The first object may be accomplished according to the principle of the present invention, which provides a device for determining a target value of a controllable variable associated with a motor vehicle, so that the controllable variable is controlled so as to coincide with the determined target value, comprising (a) detecting means for detecting a currently required output of an engine of the vehicle; (b) first determining means for determining a basic value depending upon at least the currently required output of the engine detected by the detecting means, the basic value being used as a basis for determining the target value; (c) sensing means for sensing at least one parameter representative of a running condition of the vehicle, except the currently required output of the engine; (d) means for defining a plurality of control rules based on the at least one parameter, the control rules being used for compensating the basic value; and (e) second determining means for determining a compensation factor based on the plurality of control rules according to a fuzzy set theory, so as to compensate the basic value by the determined compensation value, for obtaining the target value of the controllable variable.

The second object may be achieved according to another aspect of the present invention, which provides a method of determining a target value of a controllable variable associated with a motor vehicle, so that the controllable variable is controlled so as to coincide with the determined target value, comprising the steps of (a) detecting a currently required output of an engine of the vehicle; (b) determining a basic value depending upon at least the currently required output of the engine, the basic value being used as a basis for determining the target value; (c) sensing at least one parameter representative of a running condition of the vehicle, except the currently required output of the engine; (d) defining a plurality of control rules based on the at least one parameter, the control rules being used for compensating the basic value; and (e) determining a compensation factor based on the plurality of control rules according to a fuzzy set theory, so as to compensate the basic value by the determined compensation factor, for obtaining the target value of the controllable variable.

The currently required output of the engine may be obtained, for example, in the form of an amount of operation of an accelerator pedal, an amount of opening of a throttle valve or throttle actuator, or a rate of supply of an air-fuel mixture to the engine.

The variable whose target value is determined by the present device or method may be any variable which can be controlled, for example, torque and speed of the engine, horsepower, drive torque and acceleration value of the vehicle, and input shaft speed and speed reduction ratio of an automatic transmission of the vehicle.

In the device and method of the present invention described above, the basic value used as a basis for determining the target value of the controllable variable is first determined, in dependence upon at least the currently required output of the engine, for instance, depending upon the currently detected amount of operation of the accelerator pedal or amount of opening of the throttle valve. Then, a plurality of control rules for compensating or modifying the basic value for the target value are defined or prepared based on at least one vehicle running parameter such as the running speed of the vehicle, weight (including the load) of the vehicle, gradient of a road surface on which the vehicle is running, and an operating speed of the accelerator pedal. Finally, a compensation factor for compensating the basic value to eventually obtain the target value of the controllable variable is determined based on the control rules, by utilizing a fuzzy set theory in determining the degree of satisfaction of each control rule.

According to the present invention, the use of a relatively large number of vehicle running parameters representative of the vehicle running condition will merely increase the number of the control rules for determining or obtaining the compensation factor for the basic value, and this does not considerably increase a working load of a controller used by the present device or used for practicing the present method.

Since the fuzzy set theory is used to determine the compensation value according to the control rules reflecting the vehicle running condition, the sensing means for sensing the vehicle running parameter or parameters is simply required to provide indications, for example, whether the vehicle is heavy or light (vehicle load is large or small), whether the gradient of the uphill or downhill road is large or small. Thus, the present device and method do not require high-precision sensors which are generally expensive, and may use simple sensing means such as on-off switches.

The practicing of the fuzzy set theory in dealing with the control rules for determining the compensation factor permits the use of qualitative detection of the vehicle running condition by the simple sensing means, but assures that the determined target value exactly or adequately reflects the actual running condition of the vehicle, even if the qualitative analysis of the vehicle running parameter or parameters is a selection of one of two distinct states distinguished from each other by a certain threshold value. Thus, the determined target value will not automatically change stepwise in response to the stepwise change of the result of the qualitative analysis of the vehicle running condition, and will not deteriorate the running stability and drivability of the vehicle as perceived by the vehicle operator.

BRIEF DESCRIPTION OF THE DRAWINGS

The foregoing and other objects, features and advantages of the present invention will become more apparent by reading the following detailed description of presently preferred embodiments of the invention, when considered in connection with the accompanying drawings, in which:

FIG. 2 is a view indicating operating conditions of frictional coupling devices of the transmission, in relation to different operating positions of the transmission;

FIG. 13 is a graph showing a relationship between the compensation factor and a result of determination according to control rules 3 and 4;

FIG. 14 is a graph showing a relationship between the compensation factor and a result of determination according to control rule 6;

DETAILED DESCRIPTION OF THE PREFERRED EMBODIMENTS

Figure 1:
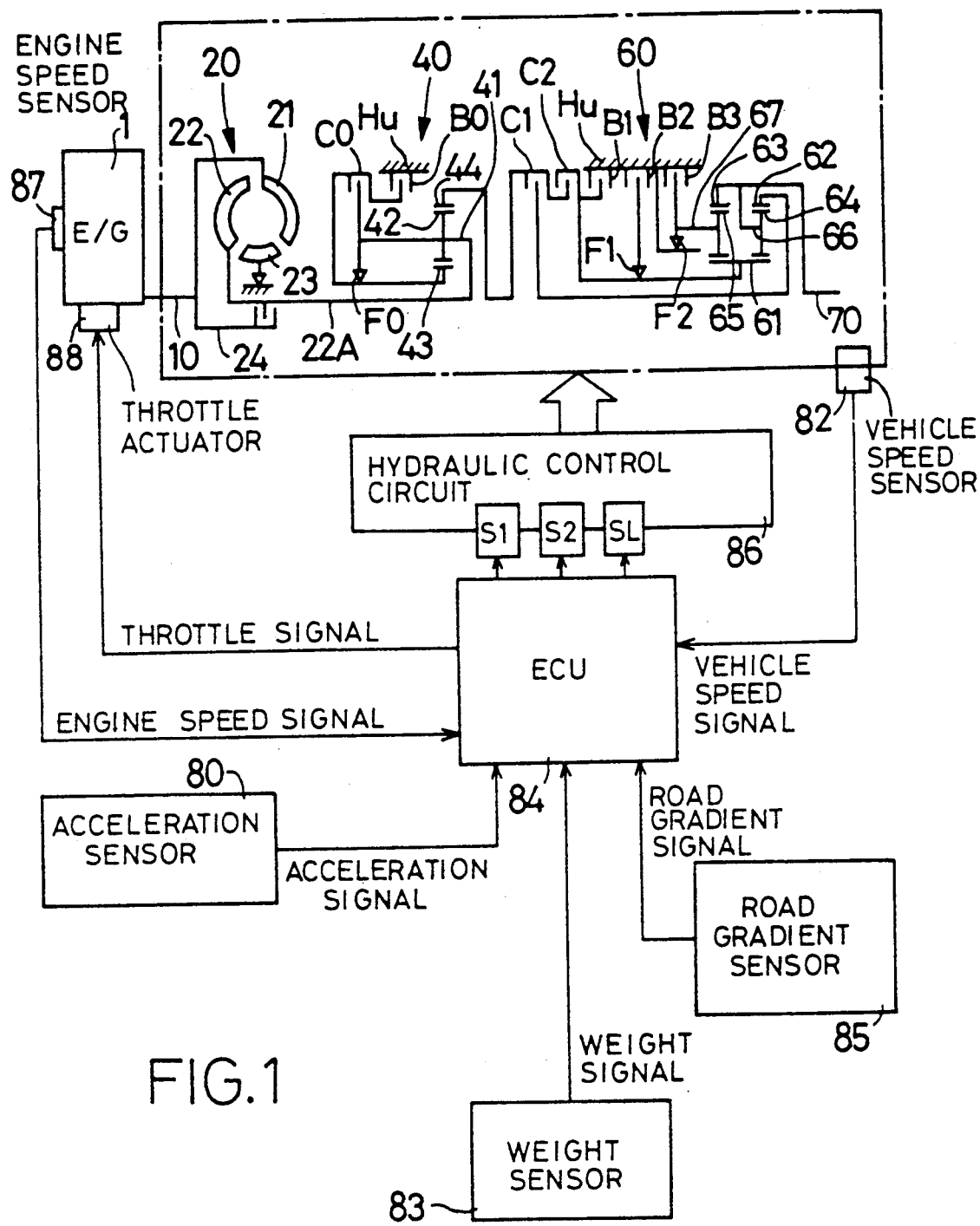
FIG. 1 is a schematic view of a power transmitting system of a motor vehicle, which includes a control system for controlling an engine of the vehicle according to one embodiment of the present invention, as well as the transmission.

Referring to the schematic view of FIG. 1, there is shown a power transmitting system of a motor vehicle, which includes a hydraulic control apparatus for controlling an automatic transmission of the system, and an electric control device for controlling the hydraulic control apparatus and controlling an engine of the vehicle according to one embodiment of the invention.

The automatic transmission indicated within a block of one-dot chain line in FIG. 1 includes a torque converter 20 connected to a vehicle engine 1 through a crankshaft 10, an overdrive mechanism 40 connected in series to the torque converter 20 through an input shaft 22A, and an underdrive mechanism 60 connected in series to the overdrive mechanism 40. The underdrive mechanism 60 has one rear-drive position "R", and three forward-drive positions "1" 1st-speed position), "2" (2nd-speed position), and "3" (3rd-speed position). The three forward-drive positions "1", "2" and "3" are selectively established while a driver-controlled shift lever is placed in one of three positions "L", "2" and "D", with the overdrive mechanism 40 placed in its off position, as indicated in the table of FIG. 2. While the overdrive mechanism 40 is placed in its on position, a fourth forward-drive position "4" (4th-speed position) may be established as needed, when the driver-controlled shift lever is in the DRIVE position "D".

The torque converter 20 is a well known arrangement which has a pump impeller 21, a turbine impeller 22, a stator 23 and a lockup clutch 24. The turbine impeller 22 is connected to the input shaft 22A of the overdrive mechanism 40.

The overdrive mechanism 40 employs a single planetary gear set consisting of a sun gear 43, a ring gear 44, a planetary pinion 42, and a carrier 41. This planetary gear set is controlled by frictionally coupling devices which consist of a clutch C0, a brake B0 and a one-way clutch F0.

The underdrive mechanism 60 incorporates two planetary gear sets which use a common sun gear 61. The first planetary gear unit includes the sun gear 61, a ring gear 62, a planetary pinion 64 and a carrier 66, while the second planetary gear set includes the sun gear 61, a ring gear 63, a planetary pinion 65 and a carrier 67. The operating condition of these two planetary gear sets, and the connection with the overdrive mechanism 40 are regulated by frictionally coupling devices which consist of clutches C1, C2, brakes B1, B2, B3, and one-way clutches F1, F2.

With the clutches C1, C2 and brakes B1-B3 of the underdrive mechanism 60 controlled as indicated in FIG. 2 one of the forward-drive positions "1", "2" and "3" is selected. With the clutch C0 and brake B0 of the overdrive mechanism 40 controlled as indicated in FIG. 2, the automatic transmission is shifted between the forward-drive positions "3" and "4". Since the automatic transmission schematically illustrated in FIG. 1 and described above is well known in the art, no further description of the transmission is deemed necessary for understanding the principle of the present invention.

The hydraulic control apparatus for controlling the hydraulically operated automatic transmission includes a hydraulic control circuit 86, which is controlled by an electric control device in the form of a computer 84. The computer 84 receives an ACCELERATION signal from an acceleration sensor 80, a VEHICLE SPEED signal from a vehicle speed sensor 82, a WEIGHT signal from a weight sensor 83, a ROAD GRADIENT signal from a road gradient sensor 85, an ENGINE SPEED signal from an engine speed sensor 87, and other signals such as a signal indicative of the currently selected position of the driver-controlled shift lever.

The ACCELERATION signal represents an amount of operation ($\theta$ac) of an accelerator pedal of the vehicle, namely, an output of the engine 1 which is currently required by the vehicle driver. However, the currently required output of the engine 1 may be represented by other parameters such as the amount of opening of a throttle valve actuated by a throttle actuator 88. The VEHICLE SPEED signal represents a speed of an output shaft 70 of the transmission. This speed is used as a parameter which represents the running speed V of the vehicle. The WEIGHT signal represents a weight W of the vehicle (including a load applied thereto). The ROAD GRADIENT signal represents an angle of inclination ($\theta$i) of a road surface on which the vehicle is running. The ENGINE SPEED signal represents a speed Ne of the engine 1.

The computer 84 incorporates a read-only memory for storing data map for shifting up and down the transmission 40, 60 depending upon the vehicle running speed V and a target drive torque TD* which is determined as described below. That is, the data map represents shift-up and shift-down boundaries in relation to the determined drive torque and vehicle speed.

The hydraulic control circuit 86 includes a solenoid operated valves S1 and S2 for operating the brakes and clutches of the automatic transmission 20, 40, 60 according to the data map stored in the computer 84, based on the currently detected running speed V of the vehicle and the currently determined target drive torque TD*, so that the automatic transmission is operated in an appropriate one of its positions as indicated in FIG. 2. The combinations of engaged and disengaged states of the coupling devices are also indicated in FIG. 2. The hydraulic control circuit 86 further includes a solenoid-operated valve SL for operating the lockup clutch 24.

The computer 84 applies a THROTTLE signal to the throttle actuator 88, according to the determined target drive torque TD*, so that the amount of opening of a throttle valve of the engine 1 is suitably controlled so as to control the torque of the engine 1 and thereby control the vehicle drive torque, such that the actual drive torque coincides with the determined target drive torque TD*.

Figure 3:
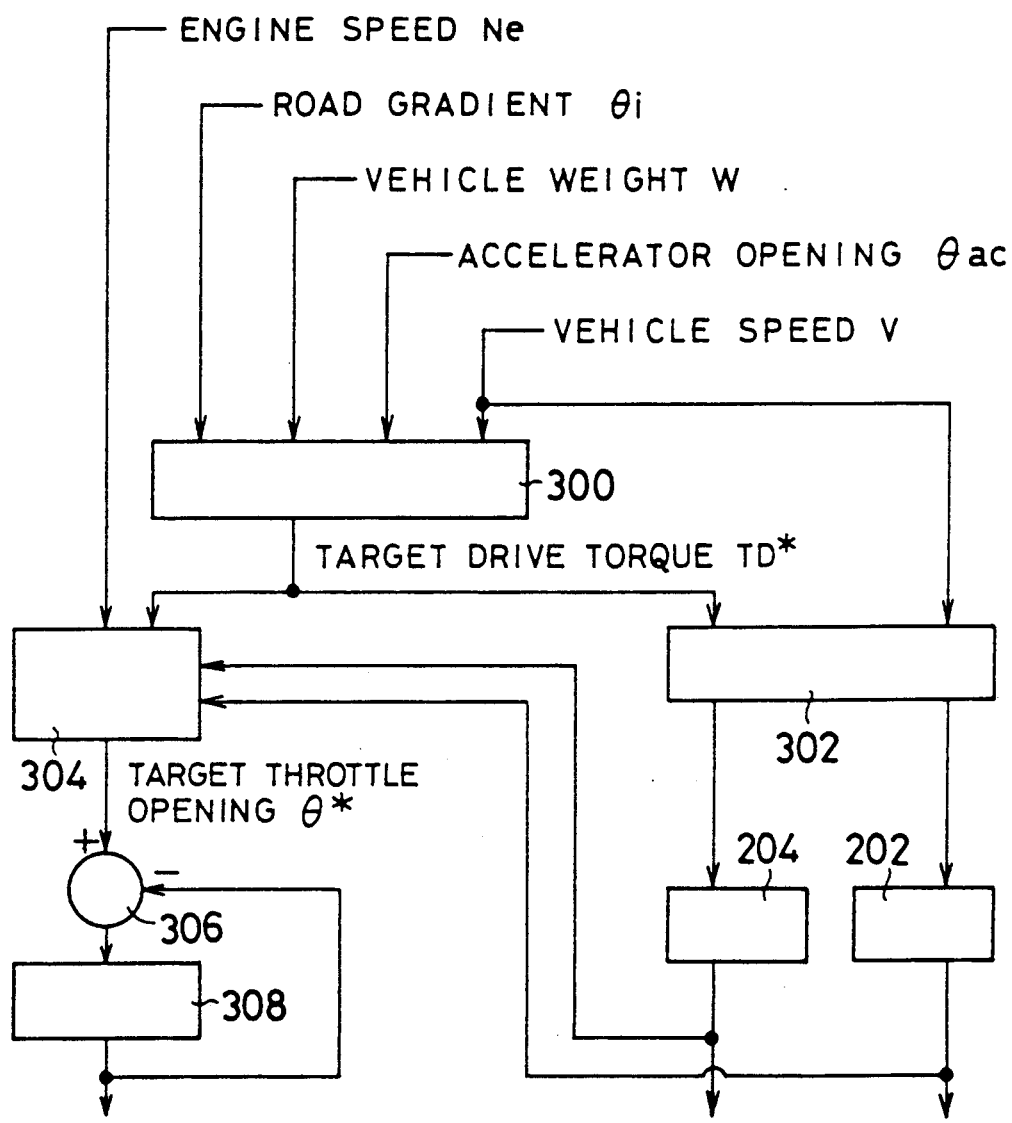
FIG. 3 is a block diagram schematically showing functional blocks of a computer used in the control system, for illustrating data processing operations performed by the computer.

Referring next to FIG. 3, an operation of the computer 84 to regulate the throttle actuator 88 will be described.

In FIG. 3, Block 300 denotes means for determining the target drive torque TD*, based on the vehicle running speed V, operating amount $\theta$ac of the accelerator pedal, weight W of the vehicle, and inclination angle $\theta$i of the road surface. The road surface inclination angle $\theta$i indicates whether the road is an uphill road or a downhill road, or a level road. The manner of determination of the target drive torque TD* will be described in detail.

Figure 6:
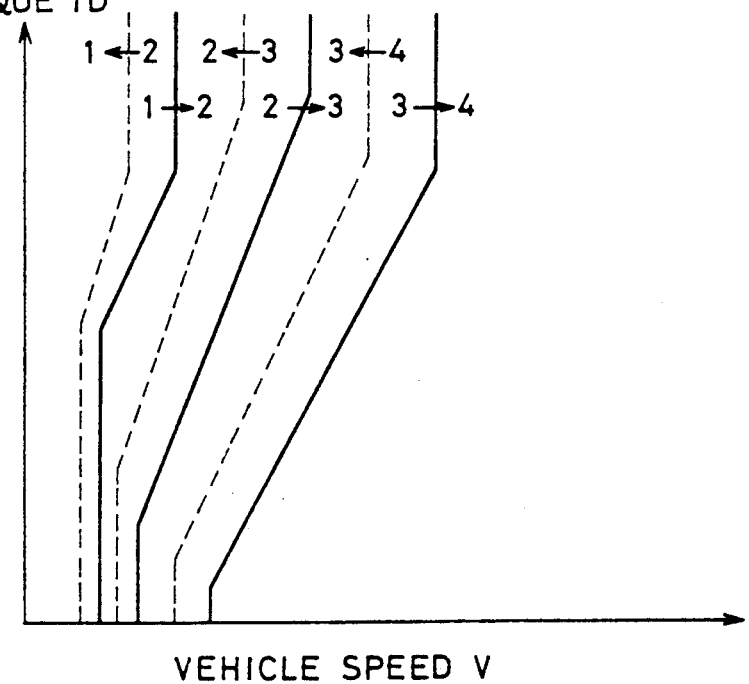
FIG. 6 is a diagram indicating shift-up and shift-down boundaries for the automatic transmission, in relation to the target drive torque and the vehicle running speed.

Block 302 designates means for determining one of the operating positions "1", "2", "3" and "4" of the automatic transmission 20, 40, 60, based on the vehicle running speed V and the determined target drive torque TD*, according to the data map representative of the shift-up and shift-down boundaries for the transmission, as illustrated in FIG. 6. The computer 84 applies command signals to the solenoid-operated valves S1 and S2 indicated at Block 204, to shift the transmission to the determined position. At this time, the lockup clutch 24 is suitably controlled by controlling the solenoid-operated valve SL indicated at Block 202.

Block 304 designates means for determining a target amount of opening $\theta^*$ of the throttle valve, based on the following parameters which include: determined target drive torque TD* represented by a signal from Block 300; engine speed Ne represented by the ENGINE SPEED signal from the engine speed sensor 87; speed reduction ratio o of the selected operating position of the transmission represented by a signal from Block 204; and a signal from Block 202 which indicates whether the lockup clutch 24 is engaged or disengaged. Described more specifically, the target drive torque TD* is divided by the speed reduction ratio $\sigma$, to calculate a torque Te of the engine 1 where the lockup clutch 24 is in the engaged state. The throttle opening amount (target throttle opening $\theta^*$) that provides the calculated engine torque Te at the currently detected engine speed Ne can be obtained from the known output characteristics of the engine 1. Thus, the target throttle opening $\theta^*$ can be determined from the target drive torque TD* determined in Block 300. When the lockup clutch 24 is not engaged, the target throttle opening $\theta^*$ is determined with a slip ratio of the lockup clutch taken into consideration.

Reference numeral 306 indicates a comparator which compares the determined target throttle opening $\theta^*$ with the actual amount of opening of the throttle valve, in order to obtain an amount of error between the target and actual amounts.

Block 308 designates means for determining a command value indicative of the determined error amount, which is applied to the throttle actuator 88 so that the target throttle opening $\theta^*$ is established by the throttle actuator 88.

In the above arrangement schematically illustrated in FIG. 3, the vehicle driver's requirement with respect to the output of the engine 1 as represented by the operating amount $\theta$ac of the accelerator pedal is first converted into the target vehicle drive torque TD*, which is then converted into the target throttle opening $\theta^*$ representative of the operating position of the throttle actuator 88 which is independent of the accelerator pedal. Namely, by controlling the throttle actuator 88 according to the determined target throttle opening $\theta^*$, the amount of opening of the throttle valve which determines the output of the engine 1 is controlled so that the driver's requirement may be met.

In the present embodiment, the principle of the invention is practiced in Block 300 so that the target vehicle drive torque TD* can be adequately or optimally determined under the varying running condition of the vehicle. It is noted that while the feedback control is effected to regulate the throttle actuator 88 for establishing the determined target drive torque TD*, this feedback control as indicated at 306 in FIG. 3 is not essential to attaining the object of the present invention.

Although the present embodiment is applied to the automatic transmission 20, 40, 60 having the torque converter 20 and the planetary gear transmission 40, 60 having four forward-drive positions, the principle of the invention is applicable to any automatic transmission, for example, a continuously variable transmission which uses variable-diameter pulleys and a belt. In this case, the target value of the speed reduction ratio or input shaft speed of the continuously variable transmission is determined and controlled according to the principle of the invention.

Referring next to the flow chart of FIG. 4, the operation in Block 300 of FIG. 3 will be described in greater detail.

Figure 5:
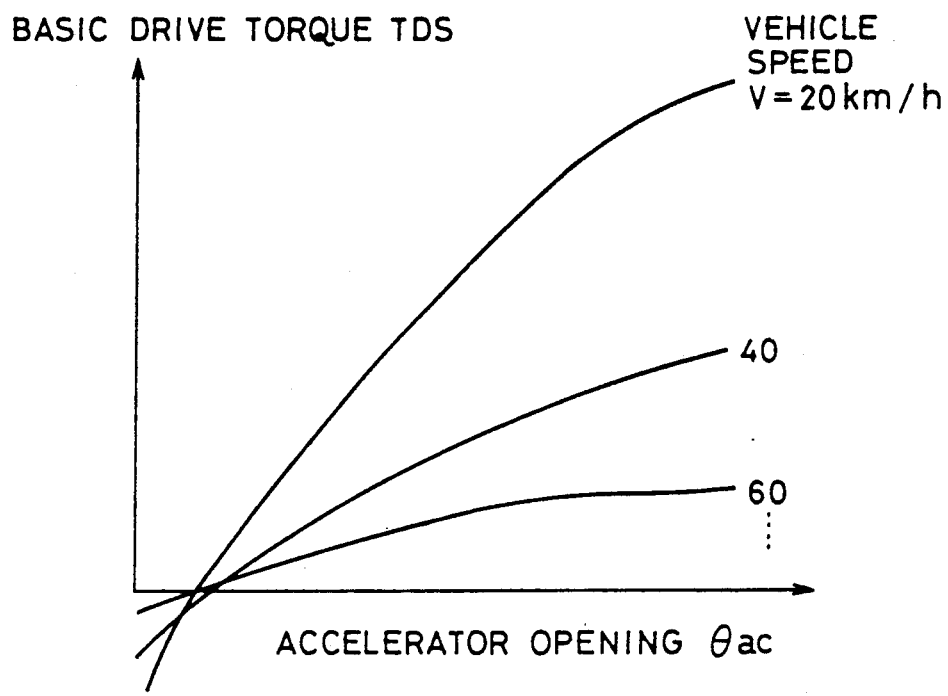
FIG. 5 is a graph showing a relationship among a basic drive torque, an operating amount of an accelerator pedal, and a running speed of the vehicle.

Initially, STEP 400 is executed to determine the basic drive torque TDS (basic value used as a basis for determining the target drive torque TD*), based on the currently detected operating amount $\theta$ac of the accelerator pedal and the currently detected vehicle speed V. The determination is effected according to a predetermined relationship among the basic drive torque TDS, accelerator operating amount $\theta$ac and vehicle speed V, that is, according to the data map as indicated in the graph of FIG. 5, which is stored in the computer 84.

The basic drive torque TDS may be determined based on only the accelerator operating amount $\theta$ac. In this case, the vehicle speed V may be later used when the target drive torque TD* is eventually determined by compensating the basic drive torque TDS.

STEPS 402, 404, 406 and 408 are then executed to determine a compensation factor c for compensating the basic drive torque TDS to obtain the target drive torque TD*. As described below, the compensation factor a is determined by utilizing a fuzzy set theory according to control rules which involve two running parameters of the vehicle, that is, the vehicle weight W and the road gradient (uphill road, downhill road or level road).

In step 410, the target drive torque TD* is calculated by multiplying the basic drive torque TDS by the determined compensation factor $\alpha$.

Steps 402, 404, 406 and 408 will then be described in detail, taking an example in which the following control rules are utilized for compensating the determined basic drive torque TDS:

CONTROL RULE 1

If the vehicle weight W is judged to be "heavy", the compensation factor $\alpha$ for the basic drive torque TDS is larger than "1".

CONTROL RULE 2

If the road is judged to be an "uphill road" and the basic drive torque TDS is a positive value, the compensation factor $\alpha$ is increased.

CONTROL RULE 3

If the road is judged to be a "downhill road" and the basic drive torque TDS is a positive value, the compensation factor $\alpha$ is decreased.

CONTROL RULE 4

If the road is judged to be an "uphill road" and the basic drive torque TDS is a negative value, the compensation factor $\alpha$ is decreased.

CONTROL RULE 5

If the road is judged to be a "downhill road" and the basic drive torque TDS is a negative value, the compensation factor $\alpha$ is increased.

CONTROL RULE 6

If the vehicle weight W is not judged to be "heavy" and the road is judged to be a "level road", the compensation factor $\alpha$ is set at "1".

The CONTROL RULES 1-6 are expressed as follows, by using a fuzzy set function or functions, with the terms "if", "then" and "and", and the appropriate symbols:

CONTROL RULE 1

If f1 (W), then $G_A (\alpha)$ ...................... (1)

CONTROL RULE 2

If f5 ($\theta$i) and f3 (TDS), then $G_A (\alpha)$ ........ (2)

CONTROL RULE 3

If f6 ($\theta$i) and f3 (TDS), then $G_B (\alpha)$ ........ (3)

CONTROL RULE 4

If f5 ($\theta$i) and f4 (TDS), then $G_B (\alpha)$ .......... (4)

CONTROL RULE 5

If f6 ($\theta$i) and f4 (TDS), then $G_A (\alpha)$ ........ (5)

CONTROL RULE 6

If f2 (W) and f7 ($\theta$i), then $G_C (\alpha)$ .......... (6)

In the above control rules, the following membership functions are used to indicate the degrees of satisfaction of the control rules:

f1 (W) ..... degree in which the vehicle weight W is heavy f2 (W) ..... degree in which the vehicle weight W is not heavy f3 (TDS) ... degree in which the basic drive torque value TDS is positive f4 (TDS) ... degree in which the basic drive torque value TDS is negative f5 ($\theta$i) .... degree of inclination of the uphill road f6 ($\theta$i) .... degree of inclination of the downhill road f7 ($\theta$i) .... degree in which the road is level $G_A (\alpha)$ ..... $\alpha$ larger than "1"

$G_B (\epsilon)$ ..... $\alpha$ smaller than "1"

$G_C (\alpha)$ ..... $\alpha$ equal to "1"

While the six control rules are used in the present embodiment, it will be understood that seven or more control rules may be used. For example, it is possible to use control rules including membership functions involving the vehicle weight condition that "the vehicle weight is considerably heavy", in addition to the above-indicated conditions that "the vehicle weight is heavy" and "the vehicle weight is not heavy". Concerning the road gradient, it is possible to use membership functions involving different ranges of inclination angles of the uphill and downhill roads, in addition to the level road.

According to the fuzzy set theory, the term "and" may be defined as an operator for an algebraic multiplication, or a minimum operation (selection of the smallest value from two or more operands). In this embodiment, however, the operator "and" is defined as the minimum operation, and the term "or" is defined as an operator for a maximum selection [selection of the largest value from two or more operands). Further, the determination according to the fuzzy set theory is conducted according to a "Mandani" process (a minimum operation which includes one or more operators for sub-minimum-operations). See the determination according to the CONTROL RULE 2 indicated below.

STEP 402

Given the vehicle weight W, basic drive torque TDS and road inclination angle $\theta$i, the computer 84 calculates values Y1-Y7 of the membership functions f1-f7.

$$Yi = fi (Xi) \quad \quad (7)$$

where, $i = 1, 2, ...., 7$

Figure 7:
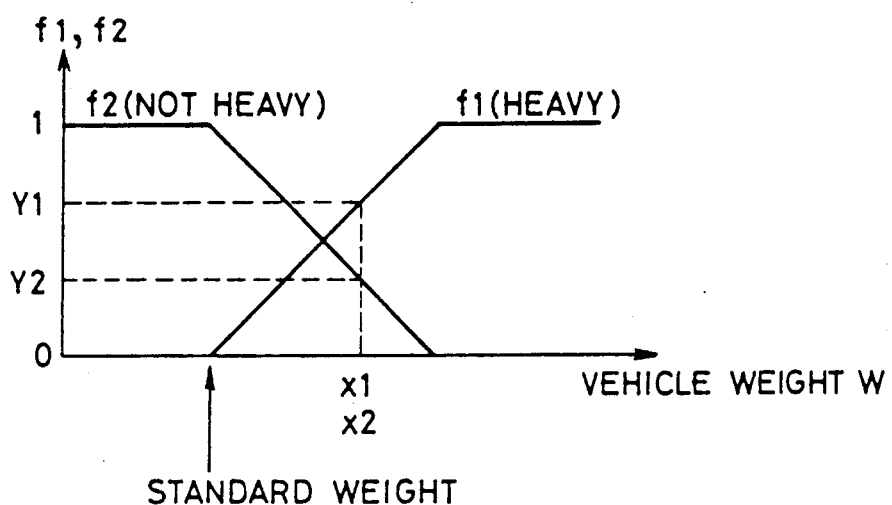
FIG. 7 is a graph showing membership functions of fuzzy sets associated with a weight or load of the vehicle.
Figure 8:
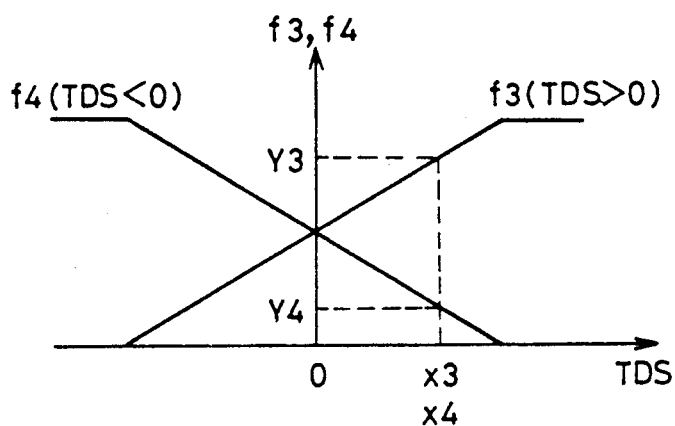
FIG. 8 is a graph showing membership functions of fuzzy sets associated with the basic drive torque.
Figure 9:
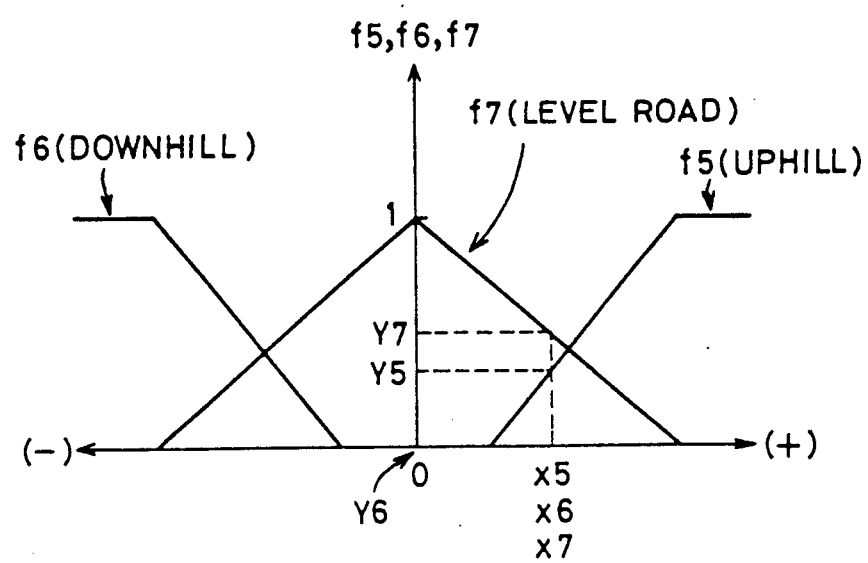
FIG. 9 is a graph showing membership functions of fuzzy sets associated with the road gradient.

FIG. 7 indicates the values Y1 and Y2 when the vehicle weight W is x1 and x2. FIG. 8 indicates the values Y3 and Y4 when the basic drive torque TDS is x3 and x4. FIG. 9 indicates the values Y5, Y6 and Y7 when the road inclination value is x5, x6 and x7 (positive value).

Figure 10:
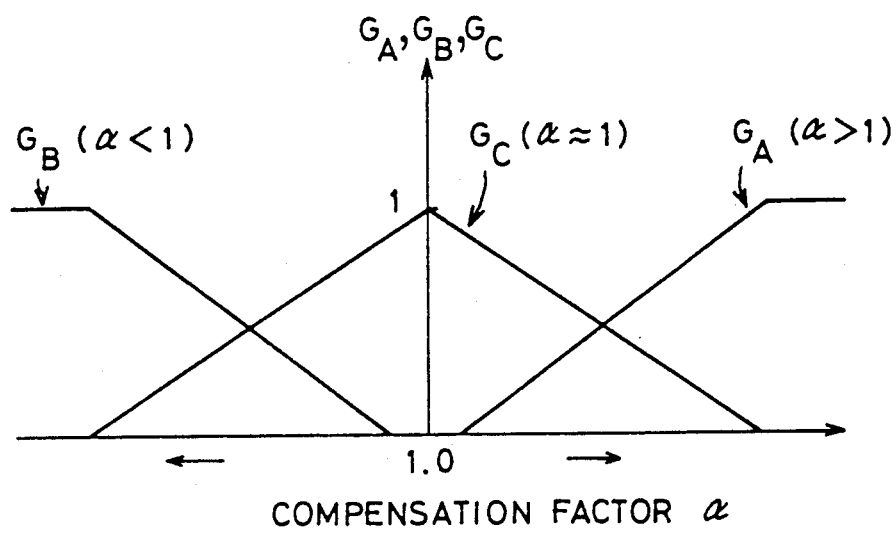
FIG. 10 is a graph showing membership functions of fuzzy sets associated with a compensation factor used for determining the target drive torque.

The membership functions $G_A$, $G_B$ and $G_C$ are indicated in the graph of FIG. 10.

STEP 404

The computer 84 calculates satisfaction data G1-G6 indicative of the degrees of satisfaction of the CONTROL RULES 1-6, by the minimum operations, as follows:

CONTROL RULE 1

G1 ($\alpha$) = min {$G_A (\alpha)$, Y1}

CONTROL RULE 2

G2 ($\alpha$) = min {$G_A (\alpha)$, min {Y5, Y3}}

CONTROL RULE 3

G3 ($\alpha$) = min {$G_B (\alpha)$, min (Y6, Y3)}

CONTROL RULE 4

G4 ($\alpha$) = min {$G_B (\alpha)$, min (Y5, Y4)}

CONTROL RULE 5

$$G5\ (\alpha) = \min\ \{G_A\ (\alpha),\ \min\ (Y6,\ Y4)\}$$

CONTROL RULE 6

$$G6\ (\alpha) = \min\ \{G_C\ (\alpha),\ \min\ (Y2,\ Y7)\}$$

Figure 11:
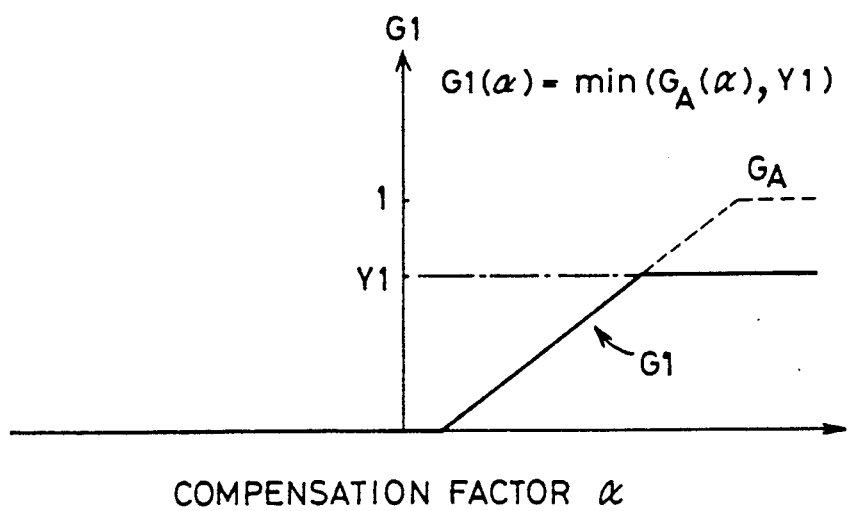
FIG. 11 is a graph showing a relationship between the compensation factor and a result of determination according to a control rule 1.
Figure 12:
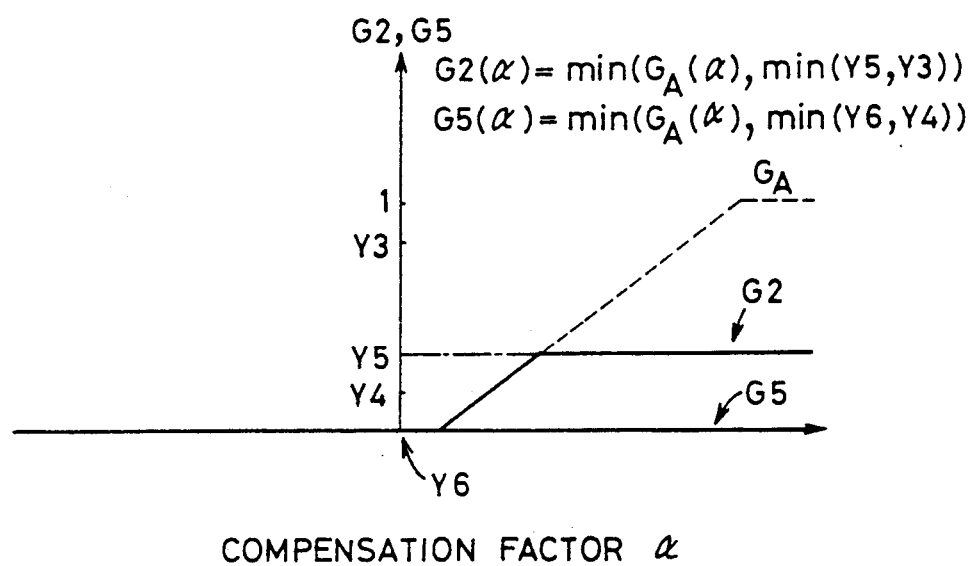
FIG. 12 is a graph showing a relationship between the compensation factor and a result of determination according to control rules 2 and 5.

Satisfaction data G1 ($\alpha$) is obtained from the membership functions $G_A$ and Y1, as indicated in the graph of FIG. 11. Satisfaction data G2 is obtained from the membership functions $G_A$ and Y5 (Y5 smaller than Y3), as indicated in the graph of FIG. 12. Satisfaction data G3 is obtained from the membership functions $G_C$ and Y6 (Y6 smaller than Y3) as indicated in the graph of FIG. 13. Satisfaction data G4 is obtained from the membership functions $G_B$ and Y4 (Y4 smaller than Y5) as indicated in FIG. 13. Satisfaction data G5 is obtained from the membership functions $G_A$ and Y6 (Y6 smaller than Y4), as indicated in FIG. 12. Satisfaction data G6 is obtained from the membership function $G_C$ and Y2 (Y2 smaller than Y7), as indicted in FIG. 14.

STEP 406

The computer 84 obtains overall satisfaction data G ($\alpha$) indicative of the overall degree of satisfaction of the CONTROL RULES 1-6, according to the following formula (8):

$$G\ (\alpha) = \max\ \{G1\ (\alpha),\ G2\ (\alpha),\ ...,\ G6\ (\alpha)\} \qquad (8)$$

STEP 408

Figure 15:
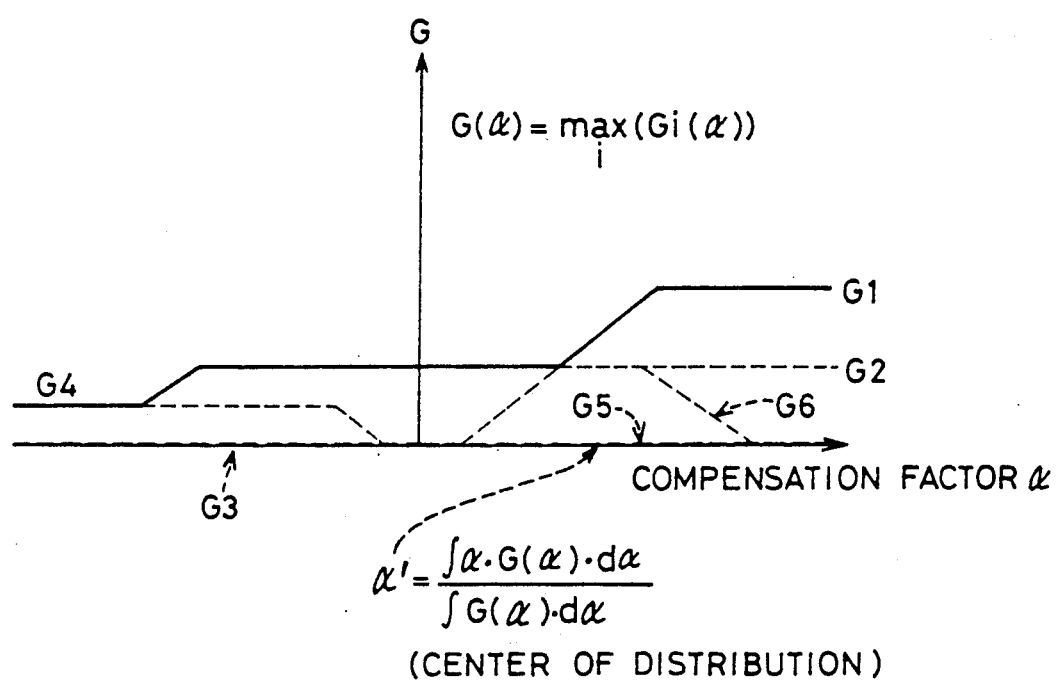
FIG. 15 is a graph showing a relationship between the compensation factor and the results of determination of the control rules, and a center of distribution of degrees of satisfaction of the rules.

FIG. 15 shows the satisfaction data G1-G6 in relation to the compensation factor $\alpha$. In the figure, $\alpha'$ indicates a center of distribution of the satisfaction degrees represented by the satisfaction data G1-G6. This distribution center $\alpha'$ indicates the overall satisfaction degree of the CONTROL RULES 1-6, i.e., the quantitative data representative of the compensation factor $\alpha$. The distribution center is obtained according to the following formula (9):

$$\alpha' = \{\int \alpha \cdot G\ (\alpha) d\alpha\} / \{\int G\ (\alpha) d\alpha\} \qquad (9)$$

STEP 410

The target drive torque TD* is calculated by multiplying the basic drive torque TDS by the compensation factor $\alpha$ which is determined as described below.

Figure 16:
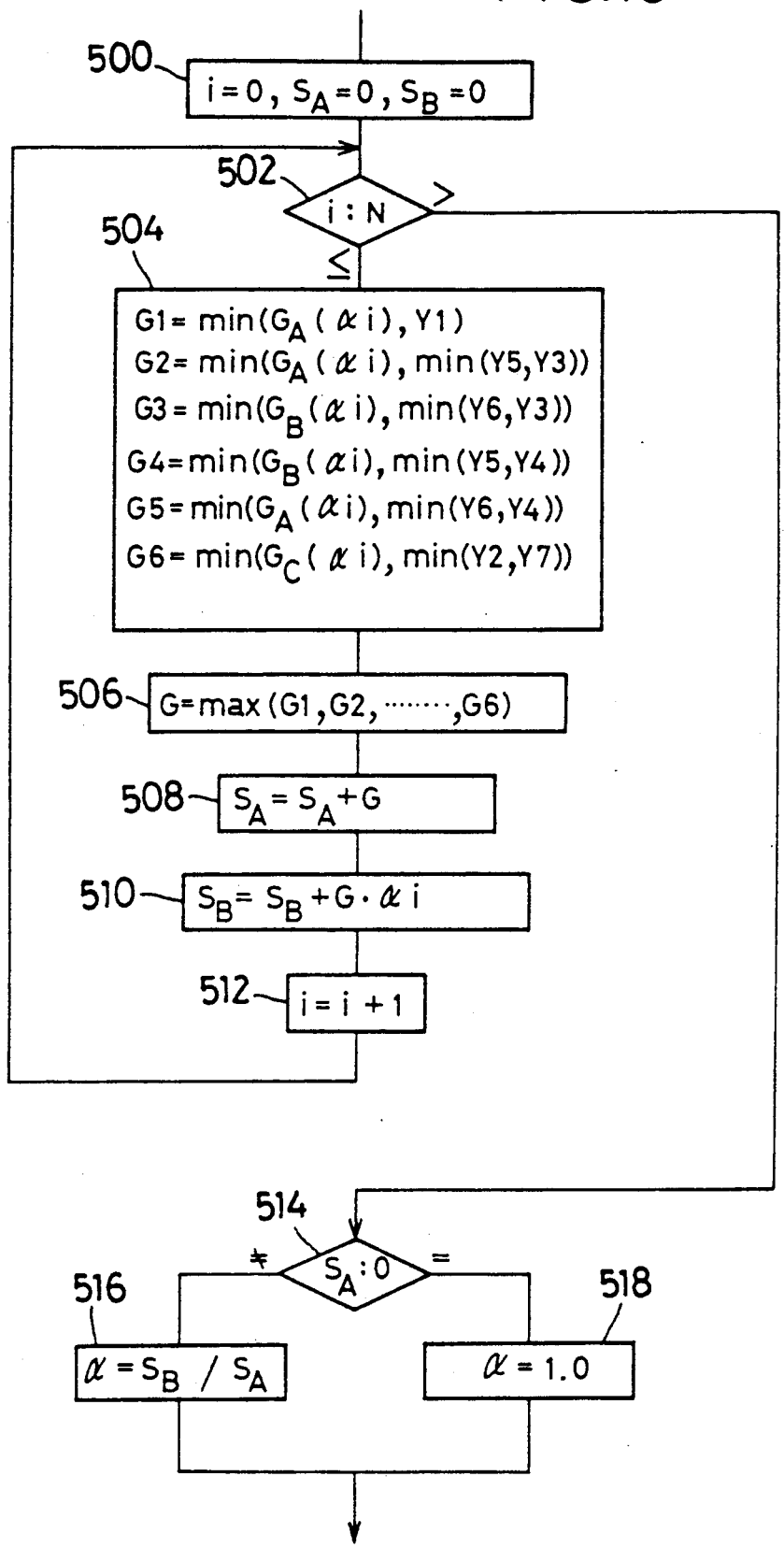
FIG. 16 is a flow chart illustrating in detail steps 404, 406 and 408 in the flow chart of FIG. 4.

STEPS 404, 406 and 408 are executed by the computer 84, as indicated in the flow chart of FIG. 16.

Step 500

Values i, $S_A$ and $S_B$ are initially reset to zero. The value i designates the number of execution of steps 504, 506, 508, 510 and 512. These steps are repeatedly executed until the number i equals N, which is the number of integrating operations required for the formula (9). The value $S_A$ indicates the denominator of the formula, while the value $S_B$ indicates the numerator of the formula.

Step 502

If the value i exceeds N, the computer 84 determines that the required number of integrating operations is completed, and the control flow goes to step 514 which will be described. If the value i is smaller than or equal to the number N, step 504 is executed.

Step 504

The computer 84 calculates the satisfaction data G1-G6 as described above with respect to STEP 404. $\alpha i$ in step 504 is expressed by the following formula (10):

$$\alpha i = \alpha \min + \Delta \alpha \cdot i \qquad (10)$$

where, $i = 0, 1, ......, N$ $$\Delta \alpha = (\alpha \max - \alpha \min)/N$$

$\alpha \max$ and $\alpha \min$ indicate the maximum and minimum values of the compensation factor $\alpha$.

Step 506

The computer 84 then obtains the overall satisfaction data G as described above with respect to STEP 406.

Step 508

The computer 84 calculates the value of the denominator $S_A$ of the formula (9).

$$S_A = S_A + G \qquad (11)$$

Step 510

The computer 84 calculates the value of the numerator $S_B$ of the formula (9).

$$S_B = S_B + G\ \alpha i \qquad (12)$$

Step 512

The computer 84 increments the value i, and the control flow goes back to step 502. Steps 502, 504, 506, 508, 510 and 512 are repeated until the value i becomes equal to N.

Step 514

If the value $S_A$ is equal to zero (or is almost equal to zero), the control flow goes to step 518 in which the compensation factor $\alpha$ is set to "1". If the value $S_A$ is not zero, step 516 is executed to determine the compensation factor $\alpha$ as $S_B/S_A$.

While the vehicle speed V is used as one running parameter of the vehicle to determine the basic torque TDS, as indicated in FIG. 5, this parameter may be used in the control rules which are dealt with according to the fuzzy set theory, as indicated above.

Although the "and" and "or" used in the control rules may be treated according to the definitions as appearing in various prior art documents relating to the fuzzy set theory, the definitions of "and" and "or" as the operators for the minimum and maximum operations as described above are effective in shortening the data processing time. However, the definition of "and" as the operator for the algebraic multiplication is comparatively widely adopted in the art.

Figure 4:
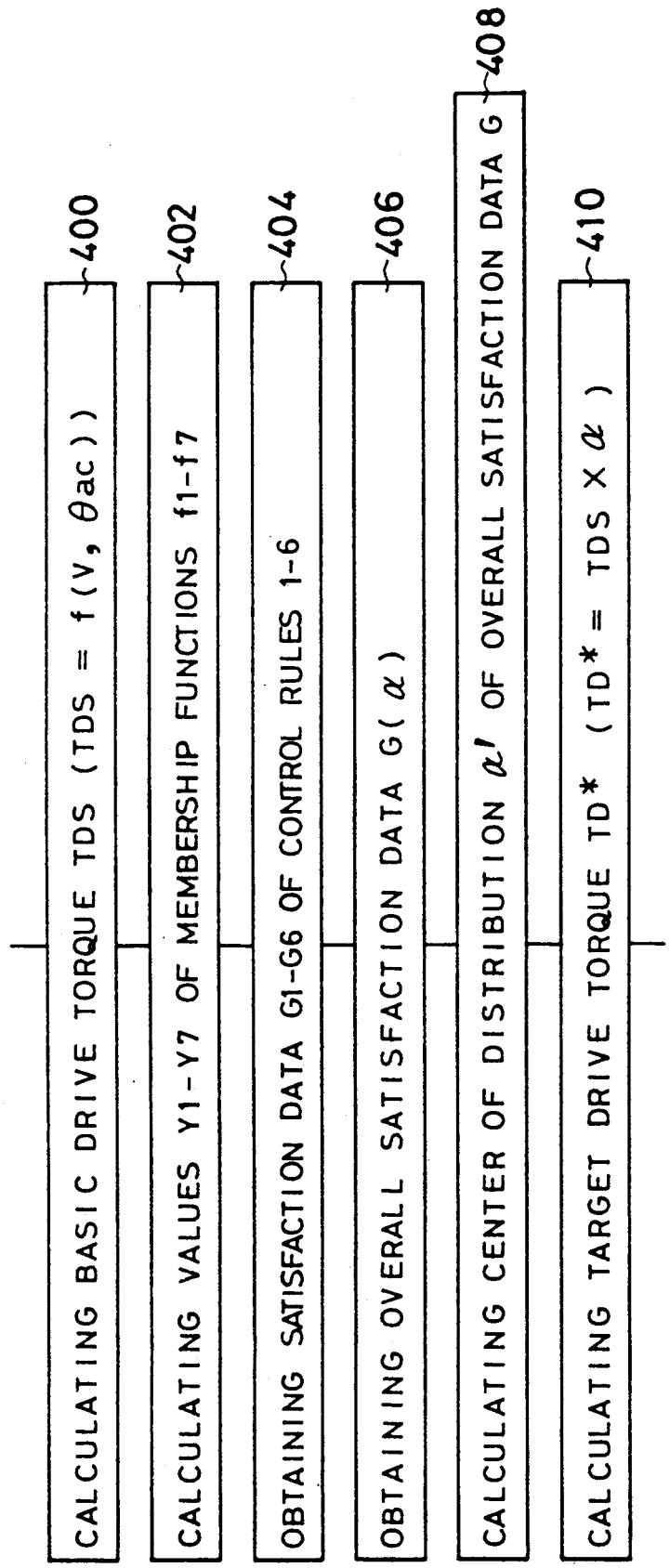
FIG. 4 is a flow chart illustrating a control routine executed by the computer.

In the illustrated embodiment described above, the distribution center $\alpha'$ of the satisfaction data G1-G6 is finally obtained in STEP 408 of FIG. 4 (step 506 of FIG. 16). However, it is possible that a distribution center $\alpha'$ of the satisfaction data G of each CONTROL RULE is obtained, and a weighted average of the distribution centers $\omega 1$-$\omega 6$ of the CONTROL RULES 1-6 is finally obtained.

For example, the distribution centers $\omega_1$ and $\omega_2$ of the satisfaction data G1 and G2 of the CONTROL RULES 1 and 2 may be obtained as follows:

$$\omega_1 = \{\int \alpha \cdot G1(\alpha)d\alpha\}/\{\int G1(\alpha)d\alpha\} \quad (13)$$

$$\omega_2 = \{\int \alpha \cdot G2(\alpha)d\alpha\}/\{\int G2(\alpha)d\alpha\} \quad (14)$$

In this case, the compensation factor $\alpha$ may be determined by obtaining the weighted average of the distribution centers $\omega_1 - \omega_6$, according to the following formula (15):

$$\alpha = \left(\sum_{i=1}^{6} Z_i \cdot \omega_i\right) / \left(\sum_{i=1}^{6} Z_i\right) \quad (15)$$

Figure 17A:
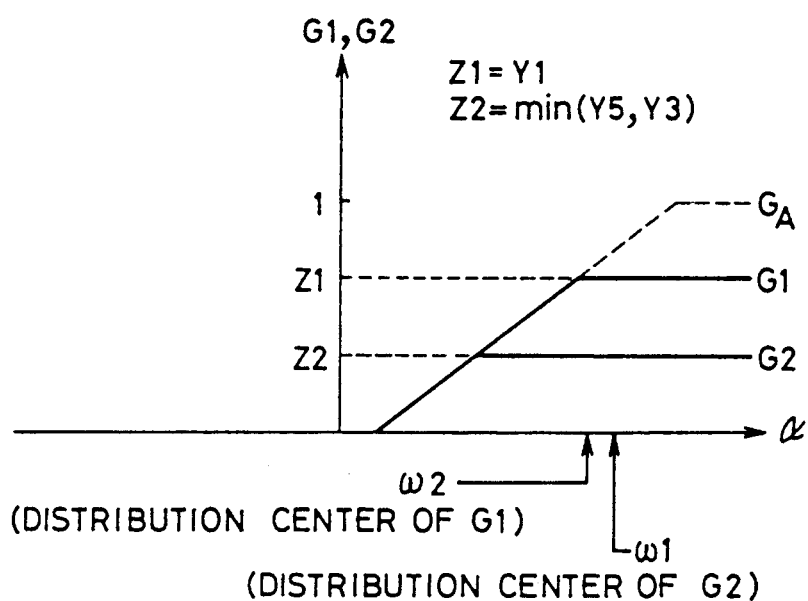
FIGS. 17(A) and 17(B) are graphs illustrating an example of obtaining distribution centers of the degree of satisfaction of the control rules 1 and 2, in determining a weighted average of the satisfaction degree of the control rules.
Figure 17B:
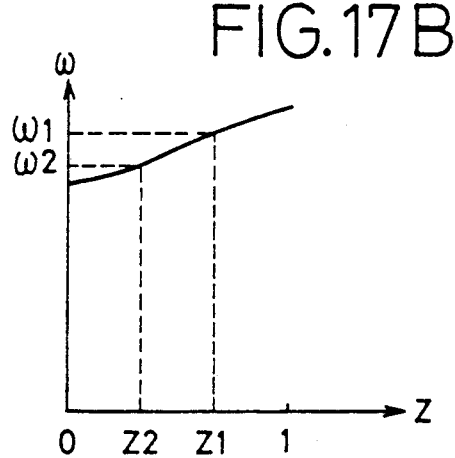

For the values $Z_i$ and $\omega_i$, please refer to the graph of FIG. 17(A). The formula (13) above may be prepared as a data map as indicated in the graph of FIG. 17(B), for improved efficiency of data processing for obtaining the distribution centers used for practicing the fuzzy set theory.

In the formula (15), $\omega_i$ represents the distribution center for the satisfaction data $G_i(\alpha)$, and $Z_i$ represents the value of the "if" clause of each of the CONTROL RULES 1-6. The values Z1-Z6 of the CONTROL RULES 1-6 are expressed by the following formulas (16)-(21):

$$Z1 = Y1 \quad (16)$$

$$Z2 = \min(Y5, Y3) \quad (17)$$

$$Z3 = \min(Y6, Y3) \quad (18)$$

$$Z4 = \min(Y5, Y4) \quad (19)$$

$$Z5 = \min(Y6, Y4) \quad (20)$$

$$Z6 = \min(Y2, Y7) \quad (21)$$

Although the illustrated embodiments are adapted such that the target vehicle drive torque TD* is determined by the fuzzy set theory based on the vehicle weight W and the road gradient $\theta_i$ according to the concept of the present invention, the invention may be similarly embodied so as to determine the target value of the engine torque Te or speed Ne, acceleration value of the vehicle, input shaft speed or speed reduction ratio of the transmission, or any other controllable variable associated with the running state of the vehicle, based on the appropriate running parameters.

It is to be understood that present invention may be embodied with various other changes, modifications and improvements, which may occur to those skilled in the art, without departing from the spirit and scope of the invention defined in the following claims.

What is claimed is:

1. A device for determining a target value of a controllable variable associated with a running state of a motor vehicle, so that the controllable variable is controlled so as to coincide with the determined target value comprising:

detecting means for detecting a currently required output of an engine of the vehicle;

first determining means for determining a basic value depending upon at least the currently required output of the engine detected by said detecting means, said basic value being used as a basis for determining said target value;

sensing means for sensing at least one parameter representative of a running condition of the vehicle, except the currently required output of the engine;

means for defining a plurality of control rules based on said at least one parameter, said control rules being used for compensating said basic value; and second determining means for determining a compensation factor based on said plurality of control rules according to a fuzzy set theory, so as to compensate said basic value by the determined compensation factor, for obtaining said target value of said controllable variable.

2. A device for determining a target value of a controllable variable according to claim 1, wherein said detecting means comprises a detector for detecting an amount of operation of an accelerator pedal of the vehicle, as said currently required output of the engine.

3. A device for determining a target value of a controllable variable according to claim 1, wherein said sensing means comprises means for sensing one of a running speed of the vehicle, a gradient of a road on which the vehicle is running, a weight of the vehicle, and an operating speed of an accelerator pedal of the vehicle.

4. A device for determining a target value of a controllable variable according to claim 1, wherein said controllable variable is selected from the group consisting of a torque and a speed of said engine, a horsepower, a drive torque and an acceleration value of the vehicle, and an input shaft speed and a speed reduction ratio of an automatic transmission of the vehicle.

5. A device for determining a target value of a controllable variable according to claim 1, wherein said plurality of control rules includes at least one rule for determining said compensation factor depending upon a weight of the vehicle as one of said at least one parameter.

6. A device for determining a target value of a controllable variable according to claim 1, wherein said plurality of control rules includes at least one rule for determining said compensation factor depending upon a gradient of a road on which the vehicle is running, as one of said at least one parameter.

7. A device for determining a target value of a controllable variable according to claim 6, wherein said at least one rule includes a plurality of rules for determining said compensation factor depending upon whether said road is an uphill road or a downhill road.

8. A device for determining a target value of a controllable variable according to claim 1, wherein said plurality of control rules includes at least one rule for determining said compensation factor depending upon said basic value determined by said first determining means, as well as upon said at least one parameter sensed by said sensing means.

9. A device for determining a target value of a controllable variable according to claim 1, wherein said second determining means determines a degree of satisfaction of each of said plurality of control rules.

10. A device for determining a target value of a controllable variable according to claim 9, wherein said second determining means further determines an overall degree of satisfaction of said plurality of control rules.

11. A device for determining a target value of a controllable variable according to claim 10, wherein said second determining means calculates a center of distribution of the degrees of satisfaction of said plurality of control rules, based on said overall degree of satisfaction.

12. A device for determining a target value of a controllable variable according to claim 9, wherein said second determining means further determines a center of distribution of each fuzzy set corresponding to each of said plurality of control rules.

13. A device for determining a target value of a controllable variable according to claim 12, wherein said second determining means calculates a weighted average of the centers of distribution of the fuzzy sets of the control rules.

14. A method of determining a target value of a controllable variable associated with a running state of a motor vehicle, so that the controllable variable is controlled so as to coincide with the determined target value, comprising the steps of:

detecting a currently required output of an engine of the vehicle;

determining a basic value depending upon at least the detected currently required output of the engine, said basic value being used as a basis for determining said target value;

sensing at least one parameter representative of a running condition of the vehicle, except the currently required output of the engine;

defining a plurality of control rules based on said at least one parameter, said control rules being used for compensating said basic value; and determining a compensation factor based on said plurality of control rules according to a fuzzy set theory, so as to compensate said basic value by the determined compensation factor, for obtaining said target value of said controllable variable.

* * * * *